(12) United States Patent
Taylor et al.

(10) Patent No.: US 7,296,719 B1
(45) Date of Patent: Nov. 20, 2007

(54) FUEL CELL ACTUATOR AND ASSOCIATED COMBUSTION TOOL

(75) Inventors: Walter J. Taylor, McHenry, IL (US); Larry M. Moeller, Schaumburg, IL (US)

(73) Assignee: Illinois Tool Works Inc., Glenview, IL (US)

( * ) Notice: Subject to any disclaimer, the term of this patent is extended or adjusted under 35 U.S.C. 154(b) by 23 days.

(21) Appl. No.: 11/411,515

(22) Filed: Apr. 26, 2006

(51) Int. Cl.
*B25C 1/04* (2006.01)

(52) U.S. Cl. .............................. 227/10; 227/8; 227/130

(58) Field of Classification Search .................... 227/8, 227/10, 130; 123/46 SC; 285/319
See application file for complete search history.

(56) References Cited

U.S. PATENT DOCUMENTS

| | | | |
|---|---|---|---|
| 4,403,722 A | | 9/1983 | Nikolich |
| 4,483,473 A | | 11/1984 | Wagdy |
| 4,483,474 A | | 11/1984 | Nikolich |
| 4,522,162 A | | 6/1985 | Nikolich |
| 5,115,944 A | | 5/1992 | Nikolich |
| 5,263,439 A | * | 11/1993 | Doherty et al. ......... 123/46 SC |
| 5,680,980 A | * | 10/1997 | Robinson ...................... 227/10 |
| 5,713,313 A | * | 2/1998 | Berry ...................... 123/46 SC |
| 5,752,643 A | * | 5/1998 | MacVicar et al. ............ 227/10 |
| 5,909,836 A | * | 6/1999 | Shkolnikov et al. ........... 227/8 |
| 6,102,270 A | | 8/2000 | Robinson |
| 6,145,724 A | * | 11/2000 | Shkolnikov et al. ........... 227/8 |
| 6,179,192 B1 | * | 1/2001 | Weinger et al. ................. 227/8 |
| 6,217,085 B1 | | 4/2001 | Toulouse |
| 6,302,297 B1 | | 10/2001 | Richardson et al. |
| 6,523,860 B1 | | 2/2003 | Shkolnikov et al. |
| 6,619,527 B1 | * | 9/2003 | Moeller ....................... 227/10 |
| 6,722,548 B2 | * | 4/2004 | Odoni et al. .................... 227/8 |
| 7,090,260 B2 | * | 8/2006 | Revol .......................... 285/369 |
| 7,134,585 B2 | * | 11/2006 | Schiestl et al. ................. 227/9 |

* cited by examiner

*Primary Examiner*—Scott A. Smith
(74) *Attorney, Agent, or Firm*—Greer, Burns & Crain, Ltd.; Lisa M. Soltis; Mark W. Croll

(57) ABSTRACT

A combustion tool for use with a fuel cell having a fuel metering valve is provided. The fuel metering valve of the fuel cell emits a prescribed volume of fuel from a fuel metering chamber through a valve stem. The tool includes a fuel cell chamber configured for receiving the fuel cell. A solenoid actuator is in operational relationship to the fuel cell chamber. The solenoid actuator is configured for pushing the fuel cell against a biasing force associated with the fuel cell. When the biasing force is overcome, the fuel cell emits fuel.

20 Claims, 4 Drawing Sheets

1

FUEL CELL ACTUATOR AND ASSOCIATED COMBUSTION TOOL

BACKGROUND OF THE INVENTION

This invention relates generally to improvements in fuel cell fuel delivery arrangements for use in combustion tools, and more specifically to actuating the fuel cell metering valve for delivering the appropriate amount of fuel for use by a combustion tool during the driving of fasteners, as well as associated combustion tools and their components.

As exemplified in Nikolich U.S. Pat. Nos. 4,403,722, 4,483,474, 4,522,162, and 5,115,944, all of which are incorporated by reference, it is known to use a dispenser such as a fuel cell to dispense a hydrocarbon fuel to a combustion tool, also known as a combustion gas-powered tool or combustion nailer, such as, for example, a combustion gas-powered fastener-driving tool. Such fastener-driving tools and such fuel cells are available commercially from ITW-Paslode (a division of Illinois Tool Works, Inc.) of Vernon Hills, Ill., under its IMPULSE trademark. In particular, a fuel cell of this type is described in Nikolich U.S. Pat. No. 5,115,944, listed above.

One design criterion associated with the use of such fuel cells, which contain separate compartments of pressurized fuel and propellant, is the prevention of leakage of one or both of the above constituents. The objective is to prevent or minimize leakage after production and before use, also known as shelf life, and also during periods when the fuel cell is installed in the tool but the tool is stored or otherwise not in use. To address this design criterion, fuel metering valves have been used to sealingly maintain the fuel inside the fuel cell until the tool is actuated.

Another design criterion of such fuel cells is that only a desired amount of fuel should be emitted by the fuel cell for each combustion event, depending on the temperature and altitude where the tool is operated. The amount of fuel should be carefully monitored to provide the desired combustion, yet in a fuel-efficient manner to prolong the working life of the fuel cell. Prior attempts to address this dosage factor have resulted in fuel metering valves attached to the fuel cell (U.S. Pat. No. 6,302,297), or located in the fuel cell (U.S. Pat. No. 5,263,439) both of which are also incorporated by reference.

A further design consideration of such fuel cells is that emission of the fuel, and therefore actuation of the tool, should be responsive to the user. In present combustion nailers with conventional fuel delivery systems, the end user must exert approximately fourteen pounds of force to actuate the tool. This amount of required actuation force can cause fatigue and strain on the user, especially after extended use.

Accordingly, there is a need for an improved combustion tool that uses a fuel cell that allows for variable fuel dosages.

There is also a need for an improved combustion tool that requires relatively less actuation force by the end user.

BRIEF SUMMARY OF THE INVENTION

The above-listed needs are met or exceeded by the present combustion tool for use with a fuel cell having a fuel metering valve. The fuel metering valve of the fuel cell emits a prescribed volume of fuel from a fuel metering chamber through a valve stem. The tool includes a fuel cell chamber configured for receiving the fuel cell. A solenoid actuator is in operational relationship to the fuel cell chamber. The solenoid actuator is configured for pushing the fuel cell against a biasing force associated with the fuel cell. When the biasing force is overcome, the fuel cell emits fuel.

An alternate embodiment of a combustion tool for use with a fuel cell having a fuel metering valve emitting a prescribed volume of fuel from a fuel metering chamber through a valve stem is also provided. The tool includes a fuel cell chamber configured for receiving the fuel cell, and a fuel line in fluid communication with the fuel cell chamber. A solenoid actuator is in operational relationship to the fuel cell chamber and includes a lengthening member engaged with the valve stem of the fuel cell. The lengthening member is configured for axially depressing the valve stein against a biasing force. Actuation of the solenoid actuator overcomes the biasing force to emit fuel from the fuel metering valve.

Also provided is another embodiment of a combustion tool for use with a fuel cell having a fuel metering valve. The fuel metering valve emits a prescribed volume of fuel from a fuel metering chamber through a valve stem and into a cylinder head. The tool includes a fuel cell chamber configured for receiving the fuel cell and a movable member in operational relationship with the cylinder head and the fuel cell chamber. The movable member is configured for reciprocal movement generally transverse to the fuel cell chamber. A solenoid actuator is disposed in the movable member. The solenoid actuator is static with respect to the cylinder head and is configured to impart a force on the movable member. Upon actuation of the solenoid actuator, the movable member moves the fuel cell, which depressed the valve stem and emits fuel.

DETAILED DESCRIPTION OF THE INVENTION

Figure 1:
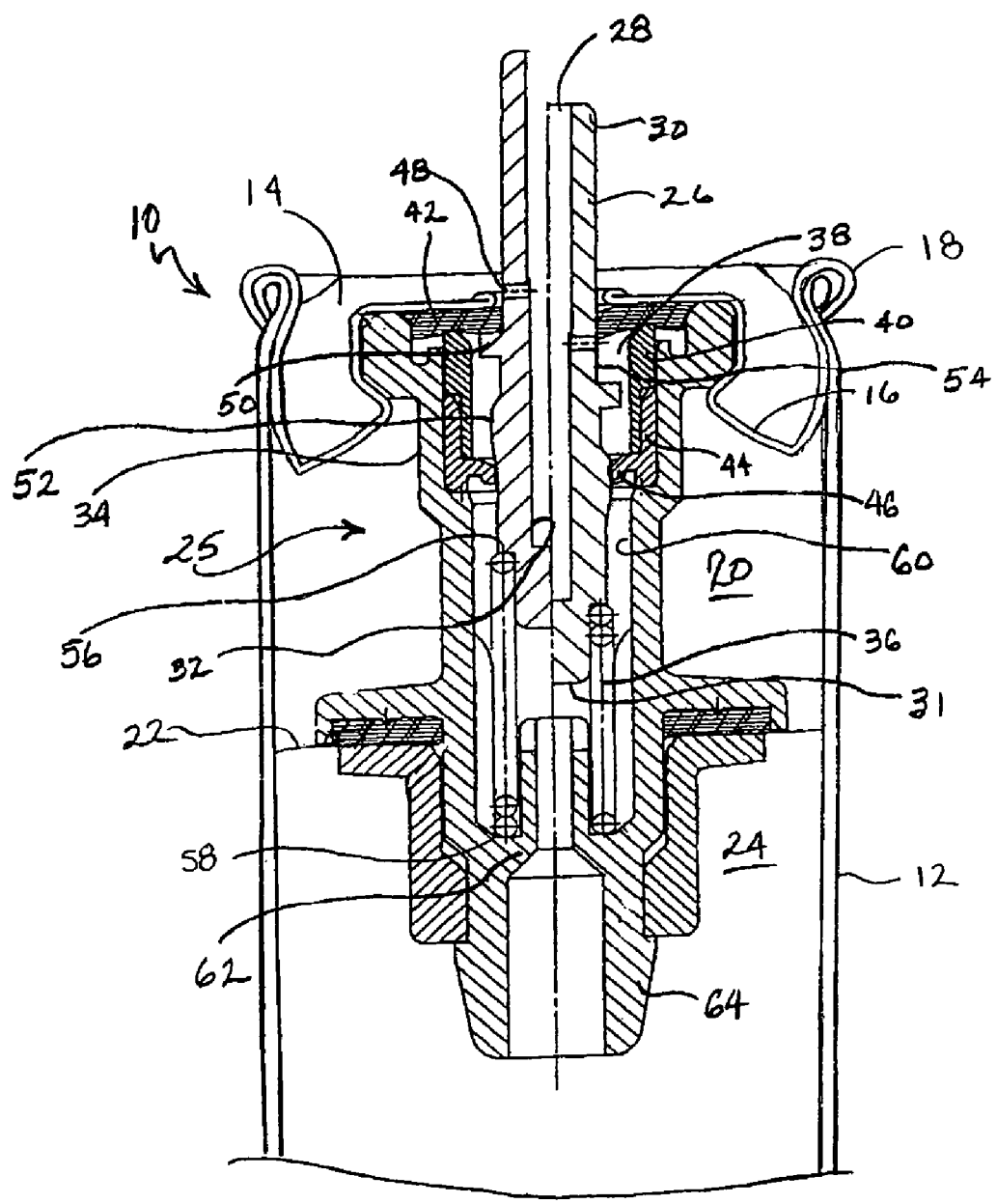
FIG. 1 is a split vertical cross-section of a combustion tool fuel cell provided with an internal fuel metering valve, shown in the closed (left) and open (right) positions.

Referring now to FIG. 1, a brief discussion of two embodiments of fuel cells 10 of the type used in a combustion tool having a solenoid actuator follows herewith. While two preferred embodiments are described, it will be appreciated that the type and configuration of fuel cell 10 can vary in accordance with the present combustion tool with a solenoid actuator.

The fuel cell is generally designated 10, and includes an outer housing or shell 12 defining an open upper end 14 enclosed by a closure 16 which is sealingly secured to the housing at a peripheral edge 18 which overlaps and is preferably crimped over the upper end, as is well known in the art. The general construction of such fuel cells is disclosed in U.S. Pat. Nos. 5,263,439, and 6,302,297 incorporated by reference herein.

Figure 2:
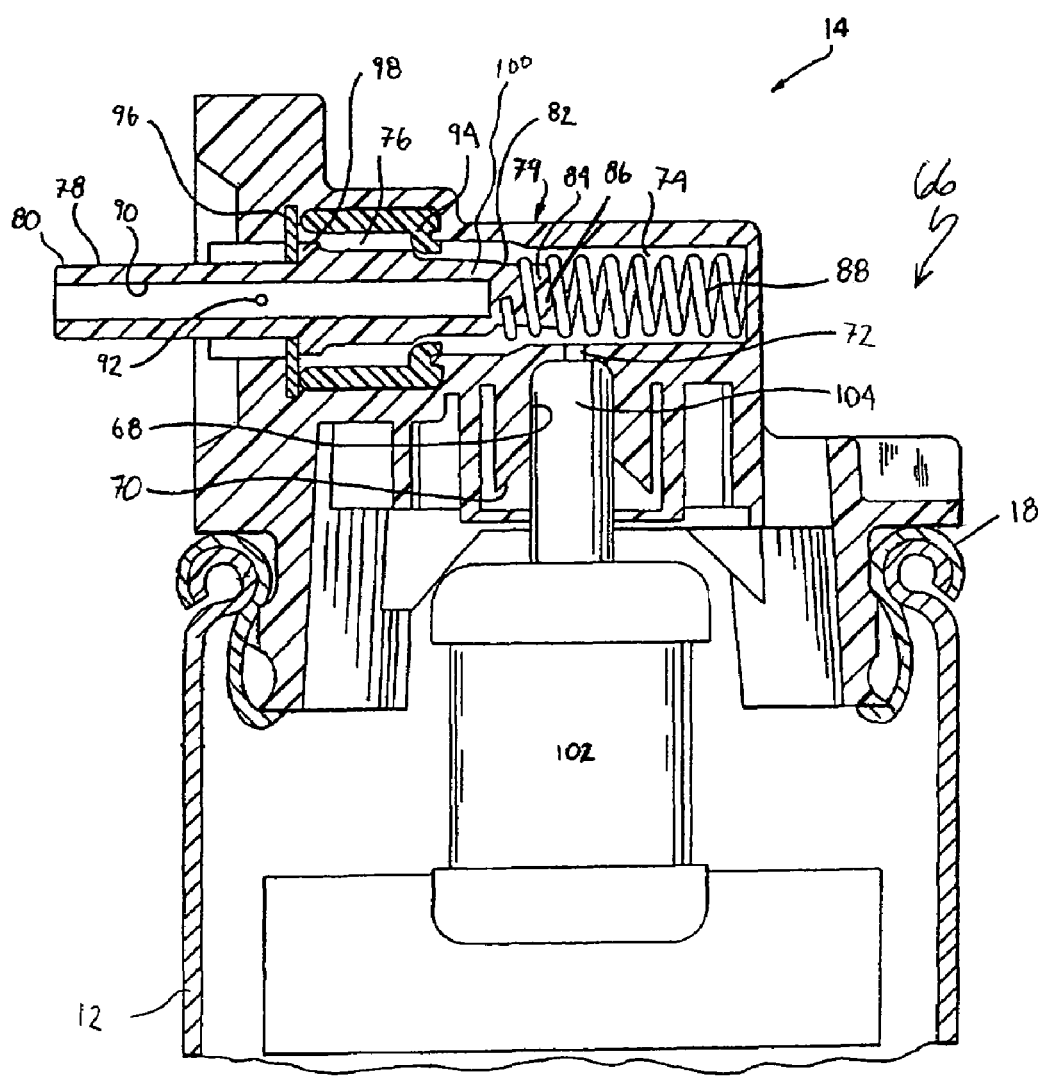
FIG. 2 is a vertical cross-section of a combustion tool fuel cell provided with an external fuel metering valve, shown in the closed position.

Inside the housing 12, a first space 20 is defined for a first component, which is typically a pressurized propellant. Also provided within the housing 12 is a container 22 defining a second space 24 for a second component, typically a combustible fuel, such as MAPP gas or other combustible gas which is liquefied under pressure. While it is preferred that the first space 20 encloses the propellant and the second space 24 the fuel, a reverse arrangement is contemplated as long as there is an environment created within the housing 12 to pressurize the fuel and maintain that pressure as the amount of fuel is reduced, as through consumption or other factors. A feature of the present fuel cell 10 is the location of an internal fuel metering valve, generally designated 25, within the housing 12. However, as will be seen later, fuel cells 10 may also use an external fuel metering valve (FIG. 2). The internal fuel metering valve of FIG. 1 is disclosed in U.S. Ser. No. 10/827,551 filed on Apr. 19, 2004, and is incorporated by reference.

A main valve stem 26 is configured for emitting fuel from the housing 12 and as such has an outlet 28 at a first end 30 projecting from the housing, and a second end 31 opposite the first end. The valve stem 26 is in fluid communication with the source of fuel, preferably the container 22. The first and second ends 30, 31 are separated from each other, preferably by a passageway 32. To emit fuel, the main valve stem 26 reciprocates relative to the housing 12 within a valve body 34 under a biasing force, preferably exerted by a biasing element 36 such as a spring, between a closed position (shown on the left half of FIG. 1) and an open position (shown on the right half of FIG. 1). In the closed position, the main valve stem 26 is biased by the biasing element 36 to an extended condition. In the open position, the main valve stem 26 is pushed back or retracted in a way that overcomes the biasing force of the element 36.

The internal fuel metering valve 25 includes the main valve stem 26 and is configured so that so that when the stem is in the open position, only a measured amount of fuel is dispensed through the outlet 28. It is preferred that the fuel metering valve 25 is configured so that the main valve stem is in the open position only when fuel is being dispensed to the tool.

The fuel metering valve 25 includes a fuel metering chamber 38 located within the housing 12. Preferably, the fuel metering chamber 38 is located within the valve body 34, however locations externally of the valve body are also contemplated. A chamber body 40 sealingly engages a main or outlet seal 42 for preventing unwanted leakage. A second component 44 includes a generally flexible, radially inwardly projecting lip 46 which slidingly and wipingly engages the reciprocating main valve stem 26.

The main valve stem 26 is configured for permitting the delivery of a designated amount of fuel to the fuel metering chamber 38 in the closed position, and for receiving that designated amount of fuel in the open position for emission through the outlet 28. To that end, among other things, the main valve stem 26 includes at least one inlet 48 and at least one generally radially projecting formation functioning as a stop member 50. The inlet 48, which is in fluid communication with the passageway 32, receives fuel from the fuel metering chamber 38 while the main valve stem 26 is in the open position, at which time the inlet is located within the fuel metering chamber. The main valve stem 26 is closed at the second end 31 and fuel enters the passageway 32 through the inlet 48.

In the closed position, the inlet 48 is no longer located within the fuel metering chamber 38, and is preferably external of the closure 16. The at least one stop member 50 is positioned on the main valve stem 26 so that it engages the outlet seal 42 and prevents further movement of the valve stem past the closure 16. An enlarged portion 52 is of sufficient diameter to sealingly engage the lip seal 46 and prevent the passage of fuel into or out of the entry of fuel relative to the fuel metering chamber 38. A standard or relatively narrow diameter portion 54 of the main valve stem 26 is located between the stop 50 and the enlarged portion 52. At the opposite end, the generally enlarged portion 52 gradually reduces in diameter to form a seat 56 for the biasing element 36. An opposite end of the biasing element engages an end 58 of a body cavity 60 in the main valve body 34 in which reciprocates the main valve stem 26.

The dosing of the fuel cell 10 occurs as follows. Fuel can pass the lip seal 46 and enter the fuel metering chamber 38 when the main valve stem 26 is in the closed position. Fuel enters the chamber 38 through the body cavity 60 which, in turn is in fluid communication with a nipple portion 62 of the valve body 34. A receiving end 64 of the nipple portion 62 of the valve body 34 is located within, and is in fluid communication with the second space 24, which preferably contains the fuel. As such, fuel enters the nipple portion 62, the cavity 60 and the metering chamber 38 prior to being emitted from the outlet 28. The amount of fuel located in the fuel metering chamber 38 is a dose of fuel.

Referring now to FIG. 2, an external metering valve, generally designated 66, will be described herein. The valve operates in a generally similar manner as the internal fuel metering valve 25 except that it is located external to the fuel cell. The metering valve 66 is shown transverse to the housing 12, although other orientations are contemplated such as the metering valve being inline with housing 12. The metering valve 66 has a generally circular intake port 68 that is defined by a tapered wall 70. An intake orifice 72 is defined above, and is in fluid communication with the intake port 68, and leads into a body chamber 74. In fluid communication with the body chamber 74 is a metering chamber 76.

The valve 66 also contains a valve stem 78 which extends out of the valve body 79 and has an outlet end 80 and a biased end 82. On the biased end 82, a locating lug 84 is found on a necked down portion 86 of the valve stein 78, where a spring 88 disposed in the body chamber 74 engages the valve stem 78. Also on the valve stem 78 is a passageway 90 extending from the locating lug 84 to the outlet end, and a valve stem orifice 92 in fluid communication with the passageway 90.

There is a lip seal 94 inside the metering chamber 76 which allows fuel to travel from the body chamber 74 to the metering chamber. There is also an outlet seal 96 located inside the valve body 79 which prevents leakage of any fuel contained in the metering chamber 76. The valve stem 78 further has a radial stop 98 formed thereon, which abuts the outlet seal 96. The valve stem 78 has two areas with a smaller diameter 100 and larger diameter. The clearance between the smaller diameter 100 and the lip seal 94 allows fuel to flow between the body chamber 74 and the metering chamber 76 as long as the valve stem is in the position shown in FIG. 2.

The fuel cell includes a tubular valve 102, which is connected to a fuel cell stem 104. When the valve 66 is engaged upon the fuel cell, the fuel cell stem 104 is matingly engaged into the intake port 68, which engagement is facilitated by the wall 70. Upon engagement, the fuel cell stem 104 is depressed against a biasing element (not shown), permitting the fuel inside the fuel cell 10 to escape out of the fuel cell stem 78, through the intake orifice 72, and into the body chamber 74. From the body chamber 74, the fuel flows between the lip seal 94 and the valve stem 78 to fill the metering chamber 76. Once the fuel cell 10 and the metering valve 66 are operationally engaged inside a combustion tool, the valve stem 78 is forced inward or to the right as shown in FIG. 2, compressing the spring 88 far enough so that the valve stem orifice is moved into the metering chamber.

As the valve stein 78 is biased against the spring 88, the increasing diameter of the valve stem pushes against the lip seal 94, preventing any more fuel from entering the metering chamber 76 from the body chamber 74. After the metering chamber 76 is sealed off, the fuel in the metering chamber travels through the valve stem orifice 92, into and through the valve stein 78, and finally into the combustion tool.

Figure 3:
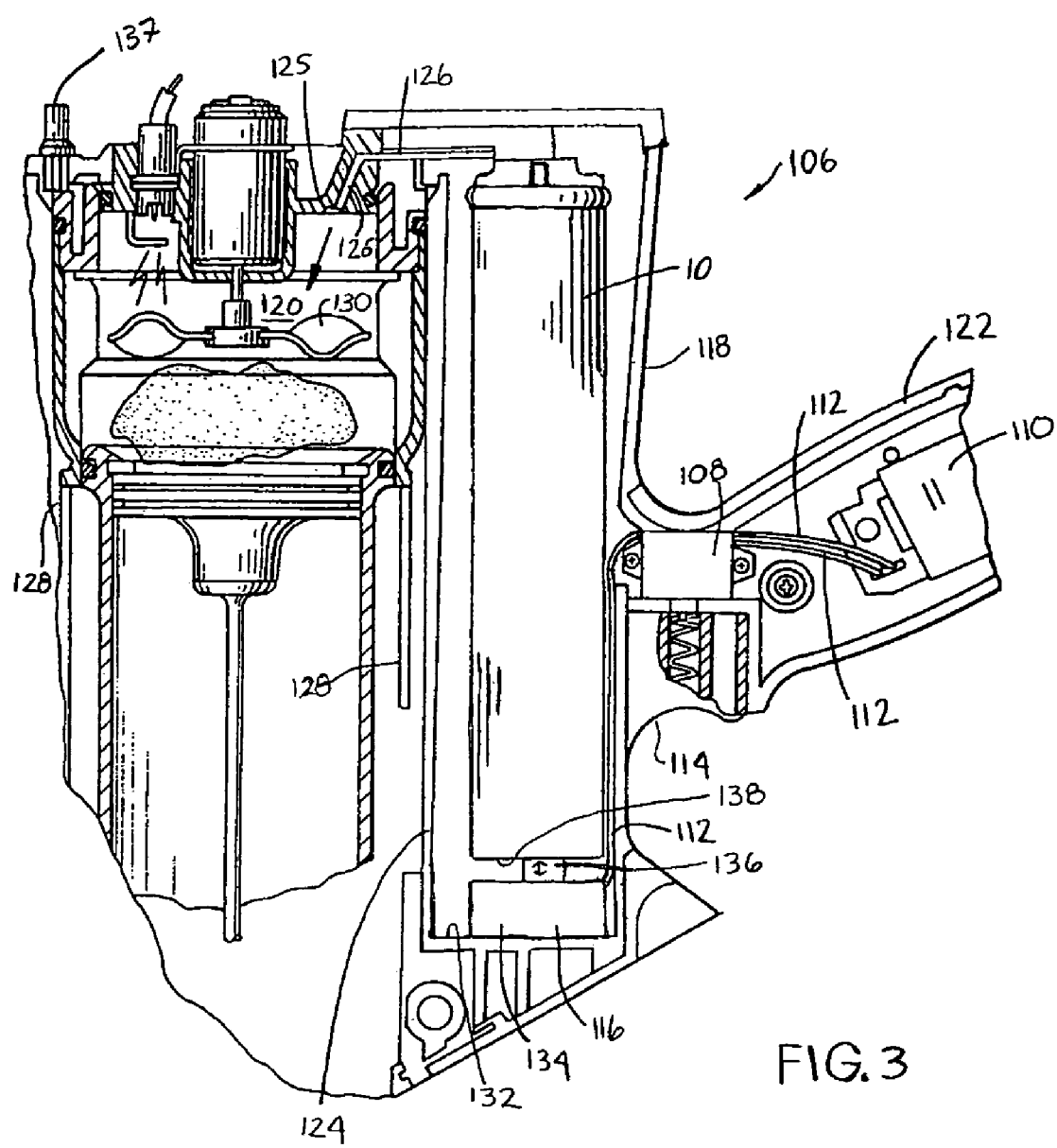
FIG. 3 is a partial vertical cross-section of a combustion tool with a fuel cell having the internal fuel metering valve disposed in the tool, and a solenoid actuator.

Referring now to FIG. 3, a tool for use with fuel cells 10 of the type described above is designated generally at 106 and is described herein. It is contemplated that the tool 106 can be used with fuel cells having different configurations, but which operate generally under the same mechanical operations and conditions. In particular, it is contemplated that the tool 106 can be used with any fuel cell 10 in which a biasing force must be overcome to emit fuel.

The tool 106 includes a battery (not shown), a trigger switch 108 and a workpiece contact element (not shown). The trigger switch 108 initiates current from a control module 110, which is connected by wires 112 to the trigger 114, which in turn, permits current to pass through the wires to a solenoid actuator 116. A manual trigger 114 is provided for closing the trigger switch 108. While a solenoid actuator is preferred, it is contemplated that any electrically powered, mechanically operating actuator may be employed to produce the desired force or motion on the fuel cell 10. Thus, for the purpose of the present application, "solenoid" applies to any electrically powered mechanical actuator.

As is known in the art, the tool 106 has an outer housing 118 encapsulating the tool components, for example a combustion chamber 120, a nosepiece (not shown), a fastener magazine (not shown) and a handle 122. A fuel cell chamber 124 is located within the outer housing 118 and is configured to receive the fuel cell 10. A cylinder head 125 is generally located at the top of the combustion chamber 120. Between the fuel cell chamber 124 and the combustion chamber 120 is a passageway or fuel line 126 in which the fuel flows from the fuel cell 10 to the combustion chamber 120.

Prior to the combustion event, the workpiece contact element is placed in contact with the workpiece (not shown) and a tool frame (not shown) is depressed against the workpiece contact element. When the workpiece contact element is pressed firmly against the workpiece, a movable member or valve sleeve 128 closes the combustion chamber 120. A fan 130 is preferably operably disposed in the combustion chamber 120 to mix fuel and air prior to combustion, and to exhaust combustion gases post combustion.

The depression of the workpiece contact element triggers several internal operational steps as are well known in the art, including the dispensing of a dose or metered amount of fuel into the fuel line 126 from the valve stein 26, 78, as described with respect to FIGS. 1 and 2, respectively. However, this depression requires the end user to exert force on the tool. The force exerted on the tool accomplishes at least two operations. First, the force mechanically moves the movable member 128 (and in the case of the external fuel metering valve, also moves the fuel cell in the transverse direction), and second, the force overcomes the spring-force of the biasing element 36 (in the internal valve), as well as stem spring 88 (in the external valve) to permit the main valve stem 26, 78 to reciprocate longitudinally relative to the fuel cell housing 12. In the conventional tool, the end user must apply a force of about 14 lbs to operate the tool.

In the embodiment of FIG. 3, the solenoid actuator 116 is located at a bottom surface 132 of the fuel cell chamber 124. The preferred solenoid actuator 116 includes a stationary stator core 134 and a movable armature 136. The armature 136 extends from the stationary iron core 134 when current from the wire set 112 flows through a coil (not shown) inside the stator core. Current through the coil creates a magnetic field, and the armature 136 moves linearly away from the coil. The movable armature 136 is spring-loaded (not shown) as is known in the art to allow the armature to retract when the current from the wire 112 is switched off.

As described above, the solenoid actuator 116 is electrically connected to the control module 110 with the wire 112. When the user depresses the tool's workpiece contact element against a work surface, the valve sleeve 128 moves to its uppermost position thereby actuating a chamber switch 137. The chamber switch provides a signal to the control module 110 to send current through wire set 112 to the solenoid actuator 116, which in turn, creates a magnetic field and results in the movement of the armature. The movement of the armature 136 is preferably parallel to the longitudinal axis of the fuel cell 10. In the preferred embodiment, when the armature 136 extends from the solenoid actuator 116, it pushes on a bottom surface 138 of the fuel cell 10. The fuel cell 10 is pushed by the armature 136, overcoming the bias of the spring element 36 in the valve stein 26, and the stem is moved into the open position to permit the flow of fuel from the fuel cell to the fuel line 126 and into the combustion chamber 120.

Thus, the solenoid actuator 116 provides electrically controlled, mechanical advantage to the tool 106 to perform the steps required to permit the flow of fuel to the combustion chamber 120. The electro-mechanical advantage of the solenoid actuator 116 is about seven pounds of force applied by the user, reducing the amount of force required to actuate the tool 106 from fourteen pounds of force to seven pounds of force.

Figure 4:
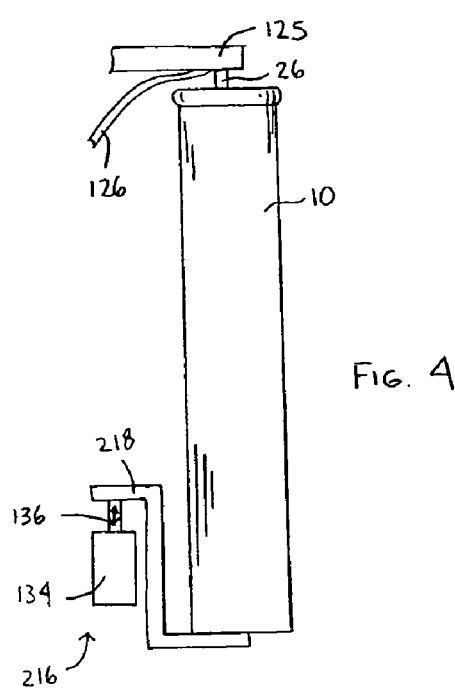
FIG. 4 is a side-view schematic of an alternate embodiment of the solenoid actuator for a fuel cell having the internal fuel metering valve.

Referring now to FIG. 4, another embodiment of a solenoid actuator is provided and is generally designated 216. Shared components with prior embodiments are designated with identical reference numbers. The solenoid actuator 216 includes a lengthening member 218, preferably an "L"-shaped arm, attached to the armature 136. Extension of the armature 136 from the stator core 134 causes the arm 218 to push up on the fuel cell 10. While this embodiment is shown with a fuel cell 10 having the internal fuel metering valve 25, it is contemplated that the solenoid actuator 216 can be used with a fuel cell having an external fuel metering valve 66, more specifically with the valve oriented inline with fuel cell 10. It is also contemplated that other shapes and arrangements of arms 218 can be used, and further, that the armature 136 and the core 134 can be located at other positions relative to the fuel cell 10. Further still, it is contemplated that the lengthening member 218 can be in shapes other than an arm-shape.

Pushing up on the fuel cell 10 causes the valve stem 26 to depress against the tool 106. In the preferred embodiment, the valve stem 26 is pushed up against the cylinder head 125 or an extension thereof. When the valve stem 26 is depressed, the stem is in the open position, and fuel is emitted from the fuel metering valve 25 (FIG. 1).

Figure 5:
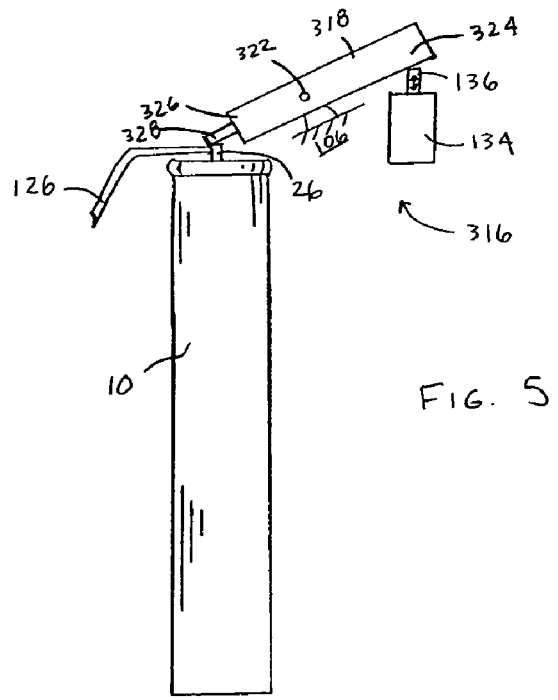
FIG. 5 is a side-view schematic of a further embodiment of the solenoid actuator for a fuel cell having the internal fuel metering valve.

In FIG. 5, another embodiment of a solenoid actuator is generally designated 316 and has a lengthening member 318. Again, shared components with other embodiments are designated with identical reference numbers. The lengthening member 318 is preferably a lever arm that provides a further mechanical advantage. The lever arm 318 is preferably pivotable about a fulcrum 322, which is preferably attached to the tool 106. Upon extension of the armature 136 from the core 134, force is imparted on a first end 324 of the lever arm 318, causing the lever arm to pivot and to push down on the valve stem 26 with a second end 326 of the lever arm. In a preferred embodiment, the lever arm 318 also includes a contact element 328 which extends from the second end 326 of the lever arm. The contact element 328 is configured to engage and depress the stem 26.

While FIG. 5 is a schematic of the fuel cell 10 with the internal fuel metering valve 25, it is contemplated that the solenoid actuator 316 with the lever arm can be used with the fuel cell having an external fuel metering valve 66. In addition, the particular size, shape and arrangement of the lever arm 318, and the relative positioning of the actuator 316 to the fuel cell 10, and the positioning of the fulcrum 322 can be varied. Similar to the embodiment of FIG. 4, pushing up on the fuel cell 10 causes the valve stem 26 to depress against the tool 106. In this embodiment, when the valve stem 26 is depressed, the stem is in the open position and fuel is emitted.

Figure 6:
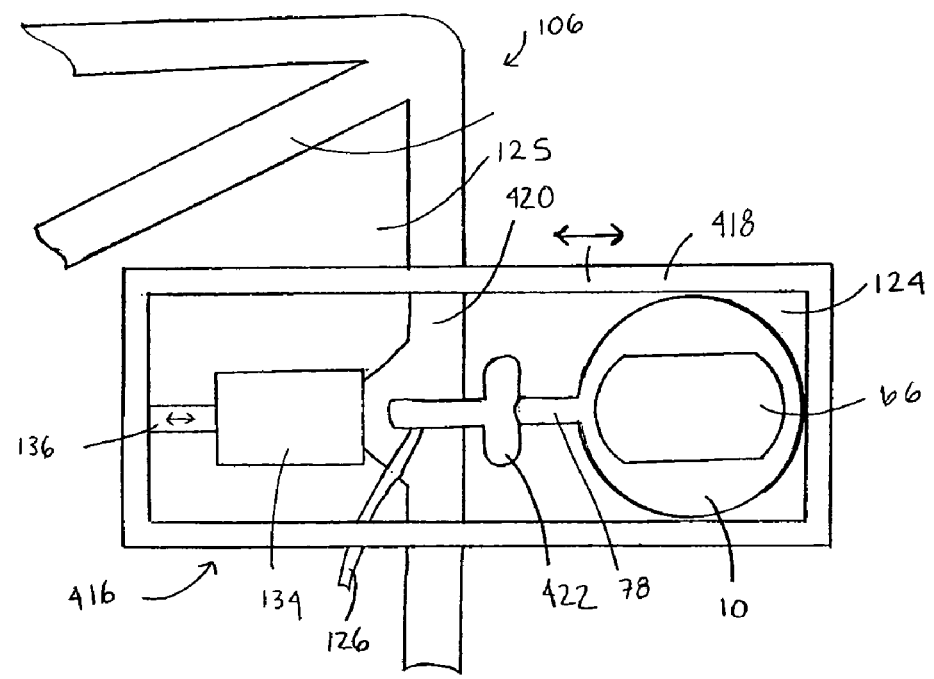
FIG. 6 is a top-view schematic of an alternate embodiment of the solenoid actuator for a fuel cell having the external fuel metering valve.

Referring now to FIG. 6, a schematic of the tool 106 configured for use with the external fuel metering valve 66 is shown. The external fuel metering valve 66 has the valve stem 78 that is generally oriented 90-degrees from the longitudinal direction of the fuel cell 10. A solenoid actuator 416 is located in a movable member, preferably a box-like fuel compartment 418, which is located adjacent a cylinder head wall 420 that separates the fuel cell chamber 124 from the cylinder head 125. The movable fuel compartment 418 moves reciprocally back in forth by the solenoid actuator 416 as shown by the bi-directional arrows. While a rectangular compartment 418 is shown in FIG. 6, it is contemplated that any linkage between the solenoid actuator 416 and the fuel cell 10, such as a cradle or a tether, can be used as a movable member. Further, while only a top portion of the fuel cell 10 is preferably linked to the solenoid actuator, it is contemplated that any portion of the fuel cell can be linked with the movable member 418.

The stator core 134 of the solenoid actuator 416 is stationary with respect to the cylinder head wall 420. Upon actuation, the armature 136 of the solenoid actuator 416 extends, pulling the movable fuel compartment 418 toward the cylinder head 125. When the fuel compartment 418 moves toward the cylinder head 125, the fuel cell contained in the compartment 418 also moves with the compartment (to the left, as shown in the schematic).

As the fuel cell 10 is moved with the compartment, the valve stem 78 is pushed against a feeding element 422. The feeding element 422 is preferably attached to and stationary with respect to the cylinder head wall 420. The movement of the fuel cell 10 against the stationary feeding element 422 provides enough force to overcome the spring 88 in the external metering valve 66, and to emit fuel from the valve stem 78. The feeding element 422 works in cooperation with a fuel line 126 to feed fuel to the cylinder head 125.

It should be noted that the various solenoid actuator embodiments of FIGS. 3-6 are mechanical variations using similar solenoid actuation principles. The present solenoid actuator invention should not be limited to the specific embodiments of FIGS. 3-6.

The solenoid actuators 116, 216, 316, 416 not only lessen the force required to be imparted by the user, but also permit the user to control the number of doses within a single tool actuation. Since the solenoid actuator 116, 216, 316, 416 can actuate quickly, the actuator can actuate multiple times in the amount of time it takes to actuate the tool and the operator can pull the trigger. By sending current through the wire set 112 to the solenoid actuator 116, 216, 316, 416 (thereby extending the armature 136), and then stopping the flow of current, (thereby retracting the armature), and subsequently sending current (thereby extending the armature), yields two doses within the same trigger actuation by the user.

Multiple dosing of the fuel cell 10 is controlled by the control module 110 pulsing the solenoid actuator 116, 216, 316, 416. Alternately, a switch (not shown) or other controller can be used by the user to set the amount of times current is sent by the control module 110 through the wire set 112 to the solenoid actuator 116, 216, 316, 416 within a trigger event. However, it is contemplated that the dosing can be controlled by other means.

The dosage of the metering valve 25, 66 can be sized such that multiple dosages provide sufficient fuel to provide the proper fuel to air required for combustion. For example, two doses can be dispensed per combustion cycle for summer applications, and three doses can provided during winter usage. It is contemplated that the dosage can be sized to provide smaller dosages, which when dosed multiple times, provides more accurate fuel to air ratios.

While particular embodiments of the present solenoid actuators and associated combustion tool has been shown and described, it will be appreciated by those skilled in the art that changes and modifications may be made thereto without departing from the invention in its broader aspects and as set forth in the following claims.

The invention claimed is:

1. A combustion tool for use with a fuel cell having a fuel metering valve emitting a prescribed volume of fuel from a fuel metering chamber through a valve stem, said tool comprising:
a fuel cell chamber configured for receiving the fuel cell; and
a solenoid actuator in operational relationship to said fuel cell chamber, said solenoid actuator configured for pushing the fuel cell against a biasing force associated with the fuel cell, whereupon actuation of the solenoid actuator overcomes said biasing force to emit fuel from the fuel metering valve.

2. The combustion tool of claim 1 wherein said solenoid actuator comprises a stator core and an armature configured for reciprocal extension and retraction with respect to said stator core, wherein when a current is received by said solenoid actuator, said armature extends, and when a current is not received by said solenoid actuator, said armature retracts.

3. The combustion tool of claim 2 further comprising a control module which is electrically connected to said solenoid actuator.

4. The combustion tool of claim 1 wherein said solenoid actuator is engaged with and imparts an axial force on a bottom surface of the fuel cell.

5. The combustion tool of claim 4 wherein said solenoid actuator pushes on the fuel cell generally axially and against a biasing force associated with said valve stem to move said valve stem to a fuel dispensing position.

6. The combustion tool of claim 1 wherein said solenoid actuator further comprises a lengthening member extending from one of an armature and a stator core, wherein said lengthening member extends to and engages the fuel cell.

7. The combustion tool of claim 6 wherein said lengthening member includes a generally "L"-shaped arm that extends from said armature to a bottom surface of the fuel cell.

8. A combustion tool for use with a fuel cell having a fuel metering valve emitting a prescribed volume of fuel from a fuel metering chamber through a valve stem, said tool comprising:
 a fuel cell chamber configured for receiving the fuel cell;
 a fuel line in fluid communication with said fuel cell chamber; and
 a solenoid actuator in operational relationship to said fuel cell chamber, said solenoid actuator including a lengthening member being engaged with the valve stem of the fuel cell and configured for depressing the valve stem against a biasing force associated with the fuel cell, whereupon actuation of said solenoid actuator overcomes said biasing force to emit fuel from the fuel metering valve.

9. The combustion tool of claim 8 wherein said solenoid actuator comprises a stator core and an armature configured for reciprocal extension and retraction with respect to said stator core, wherein when a current is received by said solenoid actuator, said armature extends, and when a current is not received by said solenoid actuator, said armature retracts.

10. The combustion tool of claim 9 wherein said lengthening member includes a lever arm pivotally connected to the tool, said lever arm having a first end configured to be engaged by one of said core and said armature, and said lever arm having a second end configured to engage said valve stem.

11. The combustion tool of claim 8 wherein said solenoid actuator exerts an axial force on said valve stem of said fuel metering valve to move said valve stem to a fuel dispensing position.

12. The combustion tool of claim 10 wherein said lever arm includes a contact element extending from said second end of said lever arm, said contact element configured to engage and depress said valve stem.

13. A combustion tool for use with a fuel cell having a fuel metering valve emitting a prescribed volume of fuel from a fuel metering chamber through a valve stem and into a cylinder head, said tool comprising:
 a fuel cell chamber configured for receiving the fuel cell;
 a movable member in operational relationship with the cylinder head and said fuel cell chamber, said movable member configured for reciprocal movement generally transverse to said fuel cell chamber;
 a solenoid actuator disposed in said movable member and including a solenoid stator body being static with respect to the cylinder head and configured to impart a force on said movable member, whereupon actuation of said solenoid actuator moves said movable member and the fuel cell, which depresses the valve stem and emits fuel.

14. The tool of claim 13 further comprising a feed element attached to and stationary with respect to the tool, wherein actuation of said solenoid actuator moves said fuel cell into engagement with said feed element.

15. The tool of claim 13 wherein said movable member moves the fuel cell against a spring in the fuel metering valve.

16. The tool of claim 13 wherein said movable member is a compartment which encapsulates said solenoid actuator and a top portion of the fuel cell.

17. The tool of claim 13 wherein said movable member is a cradle which links said solenoid actuator and a top portion of the fuel cell.

18. The tool of claim 13 wherein said solenoid actuator further comprises a stator core that is static with respect to the cylinder head, and an armature that extends and retracts from said core.

19. The tool of claim 18 wherein said armature imparts a force on said movable member to reciprocate said movable member generally transverse to the fuel cell.

20. A combustion tool for use with a fuel cell having a fuel metering valve emitting a prescribed volume of fuel from a fuel metering chamber through a valve stem, said tool comprising:
 a fuel cell chamber configured for receiving the fuel cell;
 a solenoid actuator in operational relationship to said fuel cell chamber, said solenoid actuator configured for pushing the fuel cell against a biasing force associated with the fuel cell, whereupon actuation of the solenoid actuator overcomes said biasing force to emit fuel from the fuel metering valve; and
 a control module electrically connected to said solenoid actuator and configured to dose the fuel cell one or more times during a trigger event.

* * * * *